United States Patent [19]

Grandjacques

[11] Patent Number: 5,336,347

[45] Date of Patent: Aug. 9, 1994

[54] FABRICATION PROCEDURE FOR AND STRUCTURE OF A SKI WITH A CURVED END

[75] Inventor: Philippe Grandjacques, Annecy, France

[73] Assignee: Salomon S.A., Annecy Cedex, France

[21] Appl. No.: 13,659

[22] Filed: Feb. 4, 1993

Related U.S. Application Data

[63] Continuation of Ser. No. 577,510, Sep. 5, 1990, abandoned.

[30] Foreign Application Priority Data

Sep. 5, 1989 [FR] France .................. 89 11932

[51] Int. Cl.$^5$ .......................... A63C 5/056; A63C 5/14
[52] U.S. Cl. .................... 156/221; 156/222; 156/245; 156/306.6
[58] Field of Search ............ 280/610; 156/222, 221, 156/245, 306.6, 309.6, 324.4; 264/242, 250

[56] References Cited

U.S. PATENT DOCUMENTS

| | | | |
|---|---|---|---|
| 2,213,903 | 9/1940 | Davidson | 280/610 |
| 2,228,202 | 1/1941 | Davidson | 280/610 |
| 2,371,305 | 3/1945 | Marks | 156/222 |
| 4,071,264 | 1/1978 | Legrand et al. | 280/610 |
| 4,093,482 | 6/1978 | Ogata et al. | 156/222 |
| 4,165,886 | 8/1979 | Nussbaumer | 280/610 |
| 4,184,905 | 1/1980 | Ogata et al. | 156/210 |
| 4,272,578 | 6/1981 | Schegerin | 280/610 |
| 4,443,507 | 4/1984 | Yamada et al. | 264/319 |
| 4,647,063 | 3/1987 | Piringer et al. | 280/610 |
| 4,731,038 | 3/1988 | Hancock et al. | 280/610 |
| 4,953,885 | 9/1990 | Comert | 280/610 |
| 4,993,740 | 2/1991 | Recher et al. | 280/610 |
| 5,002,301 | 3/1991 | Cagneux et al. | 280/610 |
| 5,022,943 | 6/1991 | Zaima | 156/245 |
| 5,057,170 | 10/1991 | Legrand et al. | 156/73.5 |
| 5,183,618 | 2/1993 | Pascal | 264/257 |

FOREIGN PATENT DOCUMENTS

| | | |
|---|---|---|
| 2320196 | 10/1973 | Fed. Rep. of Germany . |
| 3505605 | 8/1986 | Fed. Rep. of Germany . |
| 3636649 | 4/1987 | Fed. Rep. of Germany . |
| 3803483 | 9/1988 | Fed. Rep. of Germany . |
| 3905447 | 9/1989 | Fed. Rep. of Germany . |
| 2310871 | 12/1976 | France . |
| 2627700 | 9/1989 | France . |
| 2629352 | 10/1989 | France . |

*Primary Examiner*—Michael W. Ball
*Assistant Examiner*—Daniel J. Stemmer
*Attorney, Agent, or Firm*—Sandler Greenblum & Bernstein

[57] ABSTRACT

During the first stage, the elements of the ski structure are assembled according to an essentially rectilinear beam, including at least one thermofusible film in at least one gripping zone near either the front or back end of the structure. During the recovery stage after the first stage, this gripping zone is heated to a temperature slightly higher than the softening temperature of the thermofusible film and the heated gripping zone can be shaped in the form of a spatula and/or of the heel.

23 Claims, 4 Drawing Sheets

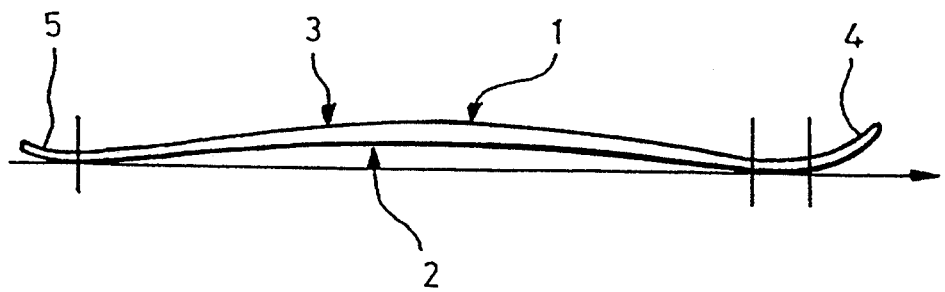
FIG_1
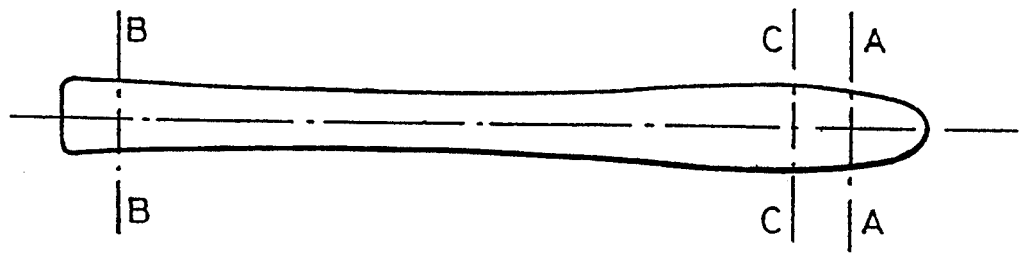
FIG_2
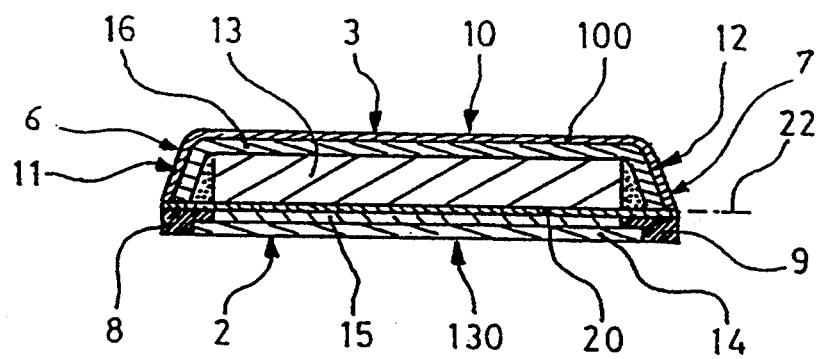
FIG_3
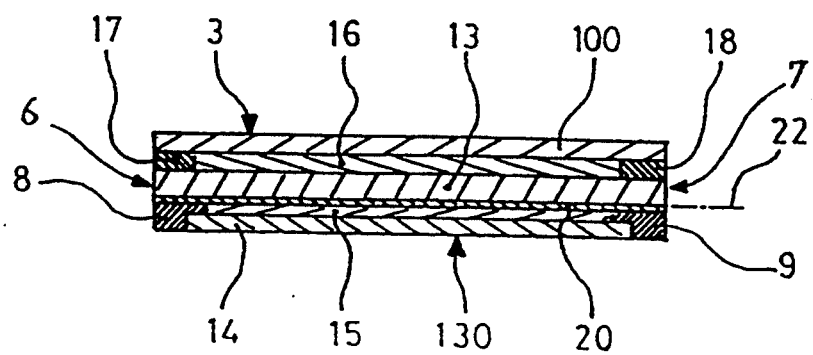
FIG_4

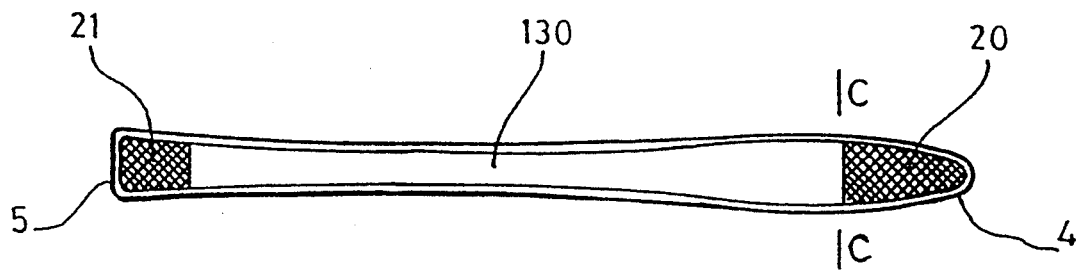
FIG_5
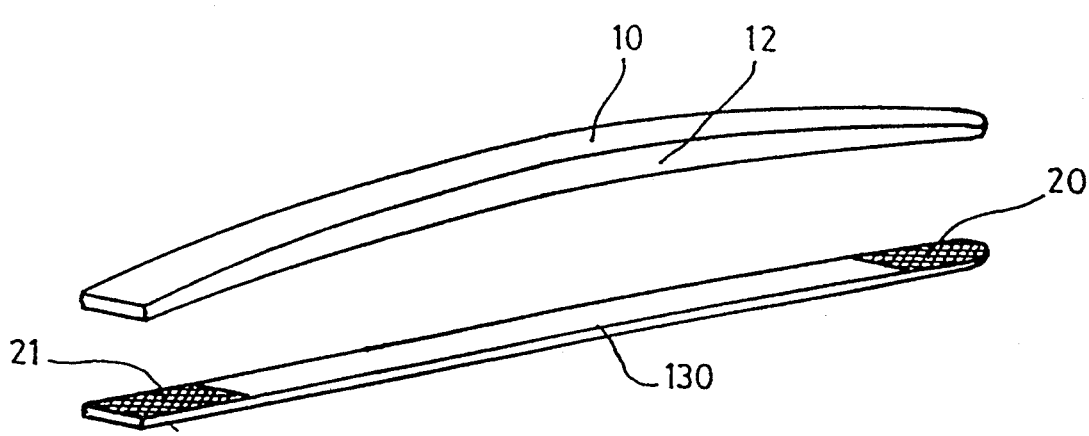
FIG_6
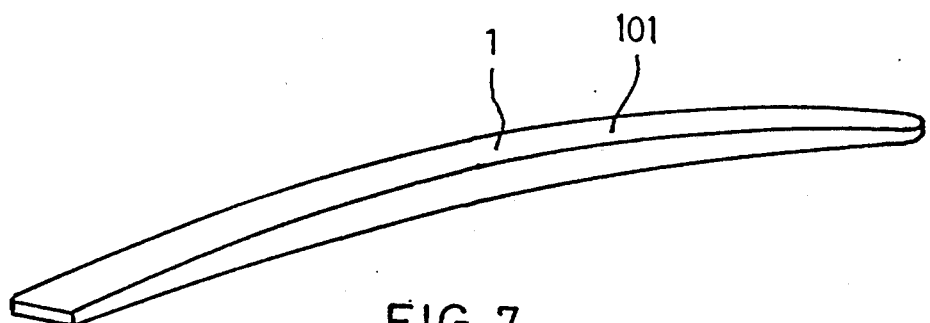
FIG_7
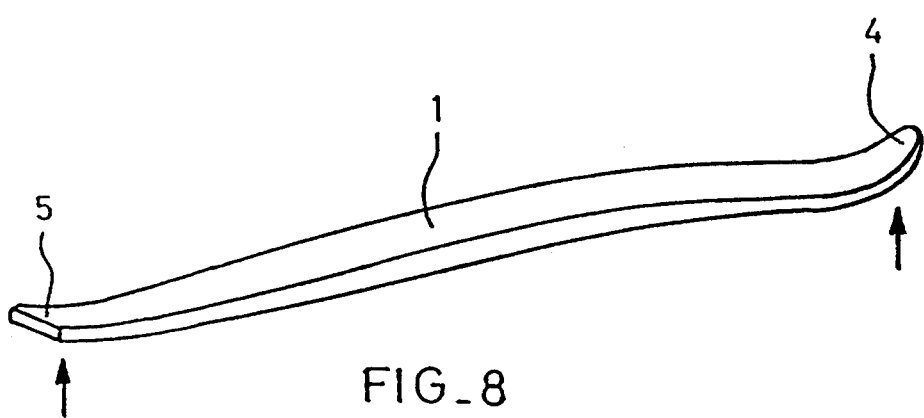
FIG_8

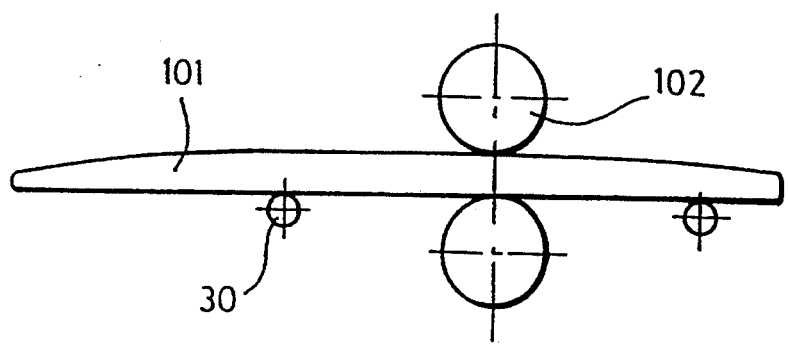
FIG_9
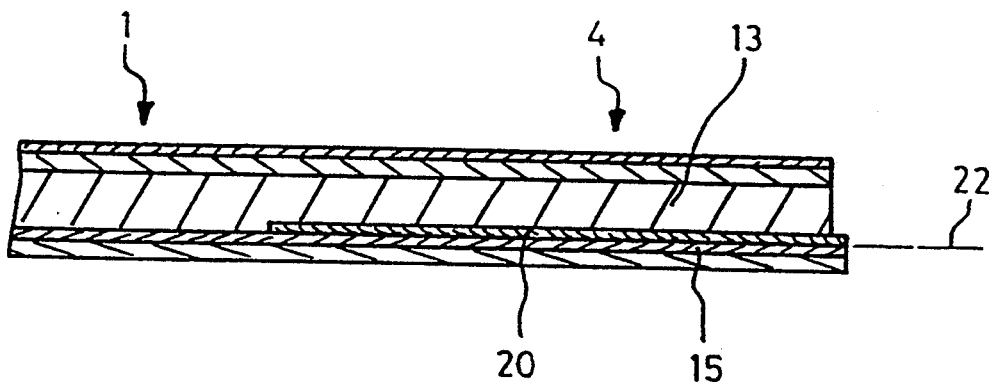
FIG_10
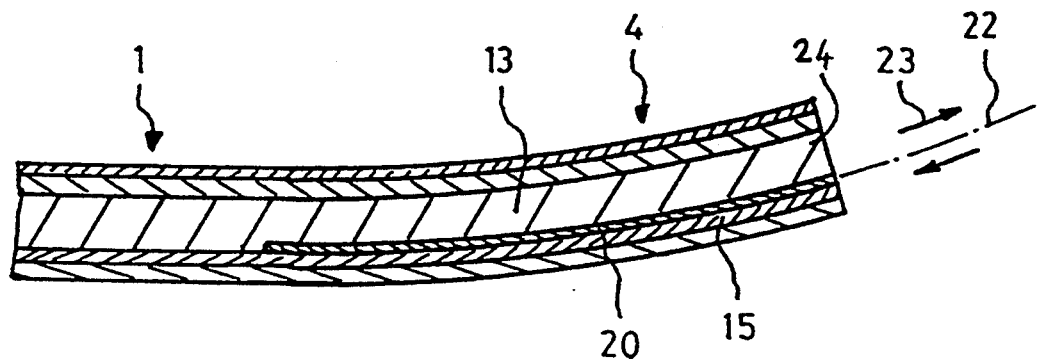
FIG_11

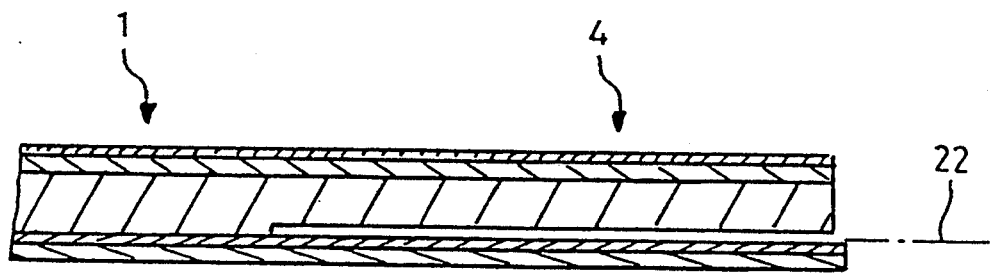
FIG_12
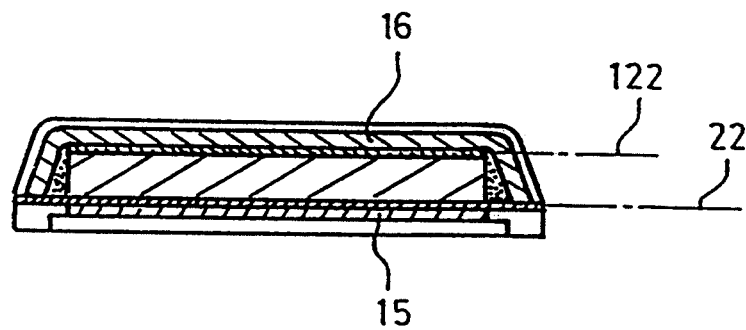
FIG_13
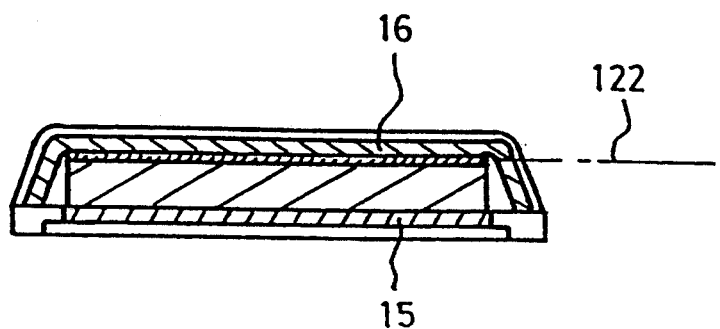
FIG_14

FABRICATION PROCEDURE FOR AND STRUCTURE OF A SKI WITH A CURVED END

This application is a continuation of application Ser. No. 07/577,510, filed Sep. 5, 1990, now abandoned.

BACKGROUND OF THE INVENTION

1. Field of the Invention

This present invention concerns skis used for winter sports, intended to slide on snow and ice.

2. Description of Background and Other Information

The skis generally include a lower sliding surface connected to two lateral sides by two lower edges furnished with metal flanges, the lateral sides connected to an upper side. The skis have a relatively small width compared to their length, thus defining a longitudinal guidance apparatus. The forward ski end is curved upward to form a spatula, the rear end of the ski is curved slightly upward to form the heel, and the middle part of the ski is cambered. Thus, when the ski is positioned on the a flat surface, it rests on a void between a transverse contact line in front and in back.

Current skis generally have a composite structure combining different materials so that each contributes the optimum, given the distribution of mechanical constraints during use of the ski. The structure generally includes peripheral protection and internal resistance elements, the latter to resist bending and twisting stress, and a core. These elements are generally assembled under heat in a mold representing the final form of the ski, with the front part significantly elevated in a spatula, the back slightly elevated in a heel, and a cambered center. Finishing operations are necessary to assure an even lower sliding surface and upper surface of the ski.

Given the relatively complex form of the ski, especially the spatula and the heel, assembly operations in the mold necessitate utilization of the mold of relatively complex form. Equally, the adjustment and the maintenance of the components in relationship to each other in the mold become complex and delicate operations by virtue of the curved ends. In addition, the finishing operations are considerably more complex than if flat surfaces were involved.

SUMMARY OF THE INVENTION

The present invention is particularly intended to avoid the drawbacks of known procedures by proposing a new procedure and ski structure which permit construction of the ski in several stages, notably reserving an intermediary stage during which the ski structure is assembled and formed without the spatula and heel curves, such that the factory finishing operations of the lower sliding surface and/or upper ski surface can be done while it is flat, facilitating the adjustment and the maintenance of the elements before assembly.

Another object of the invention is to permit the simultaneous finishing of the upper and lower surfaces of the ski, profiting from the absence of the spatula and heel curves.

At the end of the intermediary assembly stage and/or at the end of the finishing stage, the ski structures are easily stocked or transported since the uncurved ends do not interfere no matter what the length of the structure.

According to another object of the invention, the process permits several ski forms to be constructed from the same design, creating various spatula and heel curves from the same basic ski structure.

According to another object of the invention, the assembly of the ski structure occurs in a mold and a press with very simple shapes, lacking the elevated front and back ends.

Another object of the invention is to permit differentiation and personalization of skis without having to change the mold.

The invention preferably applies to all traditional ski fabrication procedures. It is often difficult to obtain ski forms that are easily duplicated, especially where the ski ends are concerned. An object of the present invention is to avoid these drawbacks and to substantially increase the ability to reproduce the forms.

To obtain these and other objects, the procedure according to the invention includes a first stage during which the ski is constructed, as in all known procedures, as an essentially flat fabrication comporting all of the elements of the ski structure, namely the central core, the reinforcing elements, and the sole structure. The procedure also includes a second stage or recovery stage after the first stage, during which at least one of the ends of the fabrication is formed in the final desired curve.

According to one fabrication process of the invention, during the first stage, at least one mold joint in at least one gripping zone close to either end of the ski is provided in its basic structure. The mold joint separates two parts according to an intermediary portion in the thickness of the structure and is generally parallel to the surface of the sole. During the recovery stage, the mold joint permits the corresponding surfaces of the two parts of the structure to slide on each other during shaping, and the two surfaces are solidified according to the mold joint by a method of solidification.

Preferably, the basic structure of the ski includes at least one upper reinforcement element which is generally flat, and a lower reinforcement element also generally flat, and the mold joint is located in the area between the upper and lower reinforcement elements.

According to a first embodiment, during the first stage, the two surfaces of the gripping zone forming the mold joint are attached with double faced adhesive which softens under the effect of an increase in temperature.

According to another embodiment, the two surfaces of the gripping zone are joined by soldering their contact surfaces, made of a material which softens when the temperature is increased, like thermofusible plastic. During the recovery stage, before or during shaping, the two surfaces are separated by localized heating following the mold joint in the gripping zone, to permit their sliding.

According to another embodiment, during the first stage, the two surfaces of the gripping zone forming the mold joint are left free, in contact with each other but without glue or soldering, and they are not solidified until after shaping, during the recovery, with solidification by riveting, glue, solder, or any other method.

According to an expedient fabrication process, during the first stage at least one thermofusible film is placed or fabricated in the basic structure of the ski in at least one gripping zone near the front or back end of structure. The film occupies an intermediary position in the thickness of the structure, and is essentially parallel to the sole surface. During the recovery stage, after the first stage, this gripping zone is heated to a temperature slightly higher than the softening temperature of the thermofusible material, the said gripping zone being shaped in a gripping mold to give it the desired form, and allowed to cool while maintaining its shape until the thermofusible film is hardened.

The procedure applies to the formation of the spatula and/or the heel.

According to one fabrication process, the basic structure of the ski containing a thermofusible film near at least one of the ends, is devoid of this film in its center. In this case, at the end of the first stage, it is helpful that the center part already exhibit the camber desired for the finished ski.

With another fabrication process, the basic structure of the ski includes a thermofusible film through the entire length of the structure. In this case, during the recovery stage, the whole structure of the ski can be heated to give the central part the desired camber as well as to form the spatula and the heel.

Thus, according to the invention, a ski obtained by such a process includes a thermofusible film in at least in the one of the front or back end areas. The advantage is that the thermofusible film is located in the zone extending from the front end to the forward contact line of the ski.

BRIEF DESCRIPTION OF THE DRAWINGS

The above and additional objects, characteristics, and advantages of the present invention will become apparent in the following detailed description of preferred embodiments, with reference to the accompanying drawings which are presented as non-limiting examples, in which:

FIG. 1 is a side view of the ski according to the invention;

FIG. 2 is a top view of the ski according to the invention;

FIG. 3 is a cross section of the ski following plane A—A of FIG. 2, with a casing structure fabrication process;

FIG. 4 is a cross section of the ski in FIG. 2 following plane A—A, with a sandwich structure fabrication process;

FIG. 5 is a top view of the longitudinal median cross section of the ski in view 1, representing the thermofusible film in the end zones;

FIG. 6 illustrates the first stage of the fabrication process according to a fabrication process of the invention;

FIG. 7 illustrates the second stage of the same process;

FIG. 8 illustrates the formation stage of the ski ends according to the invention;

FIG. 9 illustrates a particular fabrication process for the finishing stage;

FIG. 10 is a partial view of the longitudinal median cross section of the gripping zone according to the invention;

FIG. 11 represents the gripping zone of FIG. 10 after formation;

FIG. 12 is a partial view of a longitudinal cross section of the gripping zone according to a different fabrication process of the invention;

FIG. 13 is a cross section illustrating another arrangement of the mold joints; and FIG. 14 is a cross section illustrating another arrangement of the mold joints.

DETAILED DESCRIPTION OF PREFERRED EMBODIMENTS

As represented in FIGS. 1 and 2, a ski according to the invention includes, in the familiar fashion, a central cambered portion 1, with a lower concave sliding surface and an upper convex surface 3. The central portion 1 constitutes most of the length of the ski and ends in the forward part 4 elevated in spatula form and a rear end 5 also elevated in the form of a heel. The rear part 5 is relatively short and elevated relatively slightly. On the other hand, the forward spatula part 4 is longer and more elevated, as the figures illustrate.

For example, for an adult ski, the length of the central portion 1 is about 1.5 meters, and at rest the radius of the camber is about 30 meters. On the other hand, the length of the forward part 4 is around 20 centimeters, and its radius is also around 20 centimeters. The length of the rear part 5 is around 5 centimeters, and its radius about 20 centimeters.

In the cross section views, like FIGS. 3 and 4 for example, near the front and/or rear ends, the ski is delimited by its lower sliding surface 2 connected to the two lateral sides 6 and 7 by two lower edges furnished with metal flanges 8 and 9. The lateral sides 6 and 7 connect to the upper side 3.

Internal ski structures are divided into two principal families, represented respectively in FIGS. 3 and 4.

In FIG. 3, the casing structure is represented, comprising an upper rigid reinforcing element 16 in the form of a U-shaped shell section forming an upper wall 10 and two lateral walls 11 and 12, enclosing a core 13, the assembly enclosed by a lower element 130 with metal flanges 8 and 9, a layer 14 of polyethylene constituting the sliding surface 2, and a lower reinforcing element 15 in plate form. A superficial layer 100 covers the shell 16 and forms the decoration of the ski.

The core 13 can be made of different materials. For example, the core 13 can be a polyurethane foam, filling the core of the ski along most of its length. In other cases, the core 13 is an element inserted near the front and/or rear ends of the ski, which can be of any appropriate material such as plastic, metal or rubber.

In the sandwich fabrication process represented in FIG. 4, the structure is formed of core 13 placed between an upper reinforcing element 16 in plate form and a lower element 130 which has the same structure as in the fabrication process in FIG. 3. The lower element includes in particular a lower reinforcing element 15 in plate form. The upper reinforcing element is covered by a superficial layer 100 and bordered by two upper protective edges 17 and 18.

The invention process, which will be described below, can be applied to both the ski structures in FIG. 3 and 4. However, the procedure will be described in relation to a fabrication process of FIG. 3 for a casing structure.

Fabrication process according to the invention essentially occurs in two stages:

a first stage during which the basic structure of the ski is assembled with all its components, in the relatively flat form 101; and a recovery stage after the first stage, during which the ends are shaped in the form of spatula and heel, and possibly the camber of the central part of the ski, by deforming the structure 101.

In the fabrication process represented, the procedure also includes an intermediary stage during which the surfaces are finished, particularly the sliding surface.

In an expedient fabrication, illustrated by the FIGS. 6 and 7, during the first stage, a thermofusible film 20 or 21 is put in at least the basic structure of the ski in at least one of the zones near the front or rear end of the structure. The film occupies an intermediate position in the thickness of the structure, essentially parallel to the sole surface. The film 20 or 21 defines a mold joint 22, between the upper part of the structure with the upper reinforcement element 16, and the lower part of the structure with the lower reinforcing element 15. In the following discussion and in the patent claims, the mold joint designates a surface not necessarily flat but shaped by lengthwise rulings; thus without solidifying with glue, soldering or any other means in the mold joint, the surfaces in question which form the mold joint can slide lengthwise against each other.

In a particular fabrication process, this first stage occurs in a hot mold at a temperature of approximately 60° centigrade, placing the core 13 between the lower element 130 and the shell formed by the upper wall 10 and the lateral walls 11 and 12. In this case are placed, for example on the upper side of the lower element 130, two pieces of thermofusible film 20 and 21 next to the front and rear ends respectively of the lower element 130. Gluing together all of these elements occurs in the form of a beam as represented in FIG. 7. Preferably, the shell displays a cambered form from the beginning, with the center part having the camber of the finished ski. Thus, the form 101 represented in FIG. 7 is a cambered beam.

The first stage then can include a step of assembling the central core 13, an upper reinforcement element 16, a lower reinforcement element 15 and a lower layer or sole 14 in a mold, whereby these assembled components are heated and shaped to form a basic ski structure as shown in FIG. 7, or example. The basis ski structure is formed with a substantially flat front end zone which includes an upper part and a lower part thusly glued together by a thermofusible layer 20 in an intermediate position of the basic ski structure, i.e., intermediate between the upper and lower surfaces of the structure.

A finishing stage fabrication method is represented in FIG. 9. The flat form 101 is made to shift by the guidance device 30 and the surfaces to be finished come into contact with one or more rollers 102. The finishing of the upper and lower sides of the ski can thus occur simultaneously.

During the recovery stage, as represented in FIG. 8, the end portions of form 101 are heated to a temperature slightly higher than the softening temperature of the thermofusible film or insertion elements 20 and/or 21, and the end zones are shaped in the desired form. This shaping can be done into a gripping mold, for example. During the bending, sliding is produced by the mold joint 22 as represented by FIGS. 10 and 11: the central part 1 of the form remains the same, and the upper part of the structure remains integrated with the lower part. However, in the area containing the film 20, the softening of the thermofusible film permits the lower side of core 13 to slide in relation to the upper side of the lower reinforcement element 15 as represented by the double arrows 23. Thus, as the thermofusible film is sheared, the upper part 24 of the ski structure, formed by an arc of smaller diameter, tends to shift in relation to the lower part of the ski structure, which bends inward according to an arc of a larger diameter. It is then left to cool while maintaining its shape until the thermofusible film 20, 21 hardens. Solidification then prevents any sliding at mold joint 22, and assures the maintenance of the curve obtained. One can expediently form simultaneously the front end 4 in spatula form and the rear end 5 in heel form.

The recovery stage then can include the steps of re-heating at least the front end zone of the basic ski structure 7 to a temperature slightly higher than the softening temperature of the thermofusible layer 20 and shaping the front end zone into a desired curved form for forming the spatula, while the front end zone is heated for softening and shearing the thermofusible layer which permits the lower part to slide in relation to the upper part.

In the fabrication method just described, the thermofusible film 20, 21 only occupies the end zones of the ski. The central zone of the ski does not contain the thermofusible film.

It is nevertheless possible to put thermofusible film in the entire length of the ski. In the case where, during the first stage, the form 101 represented in FIG. 7 is cambered from the beginning, the central thermofusible film zone does not have any particular effect during the subsequent recovery stage to shape the front end 4 and rear end 5 of the ski. On the other hand, when thermofusible film is used along the entire length of the ski, it is possible to create during the first stage a form without a camber. The camber can then can pressed in the form during the last recovery procedure by also heating the central part of the form to give it the desired camber.

Given the curve that must be formed in the ski in its forward spatula zone 4, it is advantageous to provide, as in the invention, a thermofusible film 20 along the entire zone between the front spatula end and the forward line contact C—C. It is also advantageous to put a thermofusible film 21 along the zone between the back end of the ski and the rear contact line B—B. Thus, as is represented in FIG. 5, in the top view of the median cross section, the two thermofusible films 20 and 21 are applied to the upper surface of the lower element 130. A ski produced by the invention process thus includes thermofusible film in at least one zone near an end of the ski, and preferably in both zones 20 and 21 close to the two ends of the ski.

During the recovery stage, heating the zones containing thermofusible film can occur by the application of external heat in a mold, for example. It is then necessary to choose a thermofusible material with a lower melting point than that of the other elements in the ski. Good results were obtained by using a thermofusible material such as copolymers with a low melting point, or EVA type (ethyl vinyl acetate), or any other material. A film approximately 2/10 of a millimeter thick is sufficient.

During the recovery, to shape the ski ends, the respective zones can be heated advantageously to a temperature slightly higher than 100° C.

In the preceding fabrication method, the mold joint 22 is formed by a layer of double-sided material, assuring a double-faced adhesion in the gripping zone. Alternately, a mold joint 22 can be provided in form 101, which, in the gripping zone, does not include solidification of the surfaces of the mold joint to each other. The upper part of the form structure is then integral with the lower part of the form structure only in the central zone 1, and its two parts are separated in the mold joint, as illustrated in FIG. 12. Such a fabrication method can be obtained, for example, by assuring during the assembly of the form, a localized solder or adhesive in the central part 1 of the structure, with no method of solidification in the gripping zone. In another variation, the means to avoid soldering or gluing during the gluing of central zone 1 can be provided in the gripping zone. This device is then removed to allow sliding in the mold joint 22 during recovery. With these fabrication methods, it is necessary to provide a method of solidification after shaping to join the two surfaces of the mold joint 22. For example, an adhesive can be introduced in the space constituting the mold joint 22, or solder together by heat.

The present invention can be applied by providing a single mold joint such as the joint 22, which permits the upper part of the structure to slide in relation to the lower part. The mold joint 22 can be placed advantageously on the upper surface of the lower reinforcement element 15. Alternatively, mold joint 122 can be placed along the lower side of the upper reinforcement element 16, as represented in FIG. 14. Another advantageous possibility represented in FIG. 13 is the provision of a lower mold joint 22 at the level of the upper side of the lower reinforcement element 15, and an upper mold joint 122 at the level of the lower side of the upper reinforcement element 16.

The thermofusible film forming the mold joint, like film 20 or 21, can be made of a double-sided adhesive which softens when heated. The glue can be in the form of a liquid when it is inserted in the form 101, or in the form of a solid ribbon.

Another possibility can be, according to the invention, to join the two contact surfaces of the mold joint by rivetting after shaping in the recovery stage.

The process according to the invention comprising a recovery stage during which a curve is put in at least one of the ski ends requires a ski structure which permits this bending. The presence of a mold joint which permits the sliding of the upper part of the structure against the lower part is one element facilitating such bending. However, in the case of a ski with a casing structure, i.e. one including an upper reinforcement element 16 with a transverse cross-sectional shape of an inverse U as represented in FIG. 3, bending can become relatively difficult if the lateral edges 11 and 12 are perpendicular to the lower side 2 of the ski. It is thus advantageous, for a procedure according to the invention, to use a ski structure where the lateral walls are inclined, preferably upwards as represented in the illustration. During the recovery, these lateral walls tend to widen slightly, permitting bending.

Finally, although the invention has been described with reference of particular means, materials and embodiments, it is to be understood that the invention is not limited to the particulars disclosed and extends to all equivalents within the scope of the claims.

What is claimed is:

1. A process for manufacturing a ski, the ski having a central cambered portion and front and rear curved ends forming a spatula and a heel, respectively, the ski having a structure including a central core, an upper reinforcement element, a lower reinforcement element, and a sole, the sole having a sliding surface, the process comprising:
   a first stage comprising the step of assembling the central core, upper reinforcement element, lower reinforcement element and sole, whereby the central core, upper reinforcement element, lower reinforcement element and sole are placed in a mold and heated to form a basic ski structure having a thickness, the basic ski structure being formed with a substantially flat front end zone which comprises an upper part and a lower part glued together by a thermofusible layer in an intermediate position of the basic ski structure;
   an intermediate stage comprising the step of finishing at least the sliding surface of the sole;
   a recovery stage comprising the steps of:
      re-heating at least the front end zone of the basic ski structure to a temperature slightly higher than the softening temperature of the thermofusible layer;
      shaping the front end zone into a desired curved form for forming the spatula, while the front end zone is heated for softening and shearing said thermofusible layer which permits the lower part to slide in relation to the upper part; and
   a solidification stage comprising the step of cooling the thermofusible layer while maintaining the desired curved form of the spatula, until said layer hardens.

2. The process of claim 1, wherein the thermofusible film comprises a copolymer.

3. The process of claim 2, wherein the thermofusible film has a thickness of approximately 0.2 millimeter.

4. The process of claim 3, wherein:
   in the first stage, in the step of assembling, the step of positioning the thermofusible film comprises the step of positioning the thermofusible film between the upper reinforcement element and the lower reinforcement element.

5. The process of claim 4, wherein:
   in the first stage, in the step of assembling, the step of positioning the thermofusible film comprises the step of positioning the thermofusible film on an upper side of the lower reinforcement element.

6. The process of claim 4, wherein:
   in the first stage, in the step of assembling, the step of positioning the thermofusible film comprises the step of positioning the thermofusible film on a lower side of the upper reinforcement element.

7. The process of claim 1, wherein the thermofusible film comprises ethyl vinyl acetate.

8. The process of claim 7, wherein the thermofusible film has a thickness of approximately 0.2 millimeter.

9. The process of claim 8, wherein:
   in the first stage, in the step of assembling, the step of positioning the thermofusible film comprises the step of positioning the thermofusible film between the upper reinforcement element and the lower reinforcement element.

10. The process of claim 9, wherein:
    in the first stage, in the stp of assembling, the step of positioning the thermofusible film comprises the step of positioning the thermofusible film on an upper side of the lower reinforcement element.

11. The process of claim 9, wherein:
    in the first stage, in the step of assembling, the step of positioning the thermofusible film comprises the step of positioning the thermofusible film on a lower side of the upper reinforcement element.

12. The process of claim 1, wherein:
    in the intermediate stage, the step of finishing at least the sliding surface of the ski comprises the step of simultaneously finishing both the sliding surface and an upper ski surface.

13. The process of claim 1, wherein:
    in the recovery stage, the step of heating at least the front end zone of the ski comprises heating the basic ski structure in a mold to a temperature slightly higher than 100° Celsius.

14. The process of claim 1, wherein:
in the first stage, the step of positioning a thermofusible film in an intermediate position within the thickness of the basic ski structure comprises positioning a thermofusible film in an intermediate position within the thickness of the basis ski structure through substantially the entire length of the basic ski structure;
in the recovery stage, the step of heating at least the front end zone of the basic ski structure comprises heating substantially the entire basic ski structure to a temperature slightly higher than the softening temperature of the thermofusible film; and
the recovery stage further comprises the steps of:
shaping the rear end zone of the basic ski structure, while the rear end zone is heated, into a desired curved form for forming the heel; and
shaping a central zone of the basic ski structure, while the central zone is heated, into a desired curved form.

15. The process of claim 1, wherein:
said first stage further comprises the step of heating the basic ski structure for providing the upper part and the lower part being glued together by the thermofusible layer.

16. The process of claim 1, wherein:
said upper reinforcement element comprises a reinforcement casing element, the casing element being U-shaped in transverse cross-section; and
said step of assembling the central core, upper reinforcement element, lower reinforcement element and sole to form a basic ski structure comprises assembling the central core, the U-shaped upper reinforcement casing element, lower reinforcement element and sole to form the basic ski structure.

17. The process of claim 1, wherein:
said first stage further comprises heating the basic ski structure in a mold; and
said step of assembling a thermofusible film in an intermediate position within the thickness of the basic ski structure comprises assembling the thermofusible film at a mold joint of said mold.

18. The process of claim 1, wherein:
in the first stage, the step of positioning a thermofusible film in an intermediate position within the thickness of the basic ski structure at least at a front end zone comprises positioning a thermofusible film in an intermediate position within the thickness of the basic ski structure through substantially the entire length of the basic ski structure; and
the step of assembling further comprises forming a cambered center part, whereby the basic ski structure is assembled to comprise a central cambered zone and non-curved end zones.

19. The process of claim 18, wherein:
said upper reinforcement element comprises a reinforcement casing element, said casing being U-shaped in transverse cross-section; and
said step of assembling the central core, upper reinforcement element, lower reinforcement element and sole to form a basic ski structure comprises assembling the central core, the U-shaped upper reinforcement casing element, lower reinforcement element and sole to form the basis ski structure.

20. The process of claim 1, wherein:
the first stage further comprises the step of positioning a thermofusible film in an intermediate position within the thickness of the basic ski structure at least at a rear zone of the basic ski structure;
the recovery stage further comprises the steps of:
heating the rear end zone of the basic ski structure to a temperature slightly higher than the softening temperature of the thermofusible film positioned therein; and
shaping the rear end zone of the basic ski structure, while the rear end zone is heated, into a desired curved form for forming the heel; and
the solidification stage further comprises the step of solidifying the thermofusible film in the rear end zone while maintaining the desired curved form of the heel.

21. The process of claim 20, wherein:
in the first stage, the step of positioning a thermofusible film in an intermediate position within the thickness of the basic ski structure at least at a front end zone and at least at a rear end zone comprises positioning a thermofusible film in an intermediate position within the thickness of the basic ski structure through substantially the entire length of the basic ski structure; and
the step of assembling further comprises forming a cambered center part, whereby the basic ski structure is assembled to comprise a central cambered zone and non-curved end zones.

22. The process of claim 20, wherein:
in the first stage, the step of positioning a thermofusible film in an intermediate position within the thickness of the basic ski structure at least at a front end zone and at least at a rear end zone comprises positioning a thermofusible film in an intermediate position within the thickness of the basic ski structure through substantially the entire length of the basic ski structure;
in the recovery stage, the step of heating at least the front end zone of the basic ski structure comprises heating substantially the entire basic ski structure to a temperature slightly higher than the softening temperature of the thermofusible film; and
the recovery stage further comprises the steps of:
shaping the rear end zone of the basic ski structure, while the rear end zone is heated, into a desired curved form for forming the heel; and
shaping a central zone of the basic ski structure, while the central zone is heated, into a desired curved form.

23. A process for manufacturing a ski, the ski having a central cambered portion and front and rear curved ends forming a spatula and a heel, respectively, the ski having a structure including a central core, an upper reinforcement element, a lower reinforcement element, and a sole, the sole having a sliding surface, the process comprising:
a first stage comprising the steps of:
assembling the central core, upper reinforcement element, lower reinforcement element and sole for forming a preliminary ski structure having a thickness, the preliminary ski structure being formed in a predetermined shape without a curved spatula, said step of assembling further comprising positioning a thermofusible layer in an intermediate position within the thickness of the preliminary ski structure at least at a front end zone of the preliminary ski structure;

heating the preliminary ski structure in a mold to a temperature above the melting point of the thermofusible layer;

cooling the thermofusible layer thereby maintaining said predetermined shape of the preliminary ski structure;

an intermediate stage comprising the step of finishing at least the sliding surface of the sole of the preliminary ski structure;

a recovery stage comprising the steps of:

re-heating at least the front end zone of the preliminary ski structure to a temperature above the melting point of the thermofusible layer;

shaping the front end zone of the preliminary ski structure, while the front end zone is heated, into a desired curved form for forming the spatula; and a solidification stage comprising the step of cooling the thermofusible layer while maintaining the desired curved form of the spatula until said thermofusible layer solidifies.

* * * * *